US006476765B2

(12) United States Patent
Kawanabe

(10) Patent No.: US 6,476,765 B2
(45) Date of Patent: Nov. 5, 2002

(54) RECEPTION CIRCUIT AND ADAPTIVE ARRAY ANTENNA SYSTEM

(75) Inventor: Yoshitaka Kawanabe, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/785,533

(22) Filed: Feb. 20, 2001

(65) Prior Publication Data

US 2001/0050632 A1 Dec. 13, 2001

(30) Foreign Application Priority Data

Feb. 21, 2000 (JP) ....................................... 2000-042458

(51) Int. Cl.[7] ............................ H01Q 3/22; H04B 1/06
(52) U.S. Cl. .................................... 342/372; 455/276.1
(58) Field of Search ................................ 342/368, 372, 342/375, 383; 455/260, 276.1

(56) References Cited

U.S. PATENT DOCUMENTS 3,140,490 A * 7/1964 Sichak et al. ............... 342/368
4,367,542 A * 1/1983 DuBroff ..................... 342/368
4,373,160 A * 2/1983 Cooper ....................... 342/372
4,879,757 A * 11/1989 Loughlin ................. 455/182.1

FOREIGN PATENT DOCUMENTS

JP 10-224138 8/1998

* cited by examiner

*Primary Examiner*—Gregory C. Issing
(74) *Attorney, Agent, or Firm*—McGinn & Gibb, PLLC

(57) ABSTRACT

A reception circuit includes a reception section and control section. The reception section performs frequency conversion of an input signal by using a local frequency signal generated by phase comparing operation. The control section removes a passing phase error, added in the reception section, on the basis of a phase comparison signal output from the reception section. An adaptive array antenna system is also disclosed.

16 Claims, 6 Drawing Sheets

RECEPTION CIRCUIT AND ADAPTIVE ARRAY ANTENNA SYSTEM

BACKGROUND OF THE INVENTION

The present invention relates to a reception circuit and an adaptive array antenna system using the same and, more particularly, to a reception circuit and adaptive array antenna system which can accurately control a propagation delay phase difference at a reception section for a reception signal.

As a receiver antenna, an adaptive array antenna is available, whose beam can be electronically directed in the arriving direction of radio waves, i.e., whose directivity can be adjusted. This adaptive array antenna is widely used as an antenna suited to mobile reception, and various types of adaptive array antennas have been proposed. In general, an adaptive array antenna system has a plurality of antenna elements and is designed to obtain a desired reception signal by synthesizing outputs from reception circuits provided for the respective antenna elements.

Each of the conventional reception circuits serving as preprocessing sections combined with the respective antenna elements of the above adaptive array antenna includes an oscillator for a local oscillation signal. In this case, the respective oscillators are not necessarily consistent with each other in terms of phase, and there are phase errors between local oscillation signals. For this reason, when frequency conversion is performed by a mixer in each radio signal reception section (to be referred to as a reception section), the corresponding phase error is added to the reception signal. However, each signal after addition varies in passing phase at the corresponding reception circuit. That is, this phase is not fixed. It is therefore impossible to detect a propagation delay phase difference upon reception by the antenna at the subsequent stage.

As described above, a propagation delay phase difference in each reception circuit is not controlled. For this reason, in an adaptive array antenna or the like designed to operate by using a plurality of reception circuits at once, in particular, a random propagation delay phase different in each reception circuit directly influences the performance of the apparatus in use. That is, when reception circuits are used for an adaptive array antenna system or the like, since a propagation delay phase difference of a reception signal cannot be accurately calculated, correction and the like cannot be performed. If, therefore, a propagation delay amount in each reception circuit can be managed and controlled, the apparatus performance can be improved.

As one of the measures against such a problem, a shared synthesizer scheme may be provided. For example, an example of this arrangement is disclosed in Japanese Patent Laid-Open No. 10-224138. In this type of adaptive array antenna system, however, oscillators equal in number to channels must be prepared. In addition, since signals must be distributed to the respective reception circuits through a coaxial cable or the like, the apparatus becomes bulky.

SUMMARY OF THE INVENTION

It is an object of the present invention to provide a reception circuit and adaptive array antenna system which can accurately reproduce the propagation phase delay characteristics of a reception signal.

It is another objet of the present invention to provide a reception circuit and adaptive array antenna system which have small-scale circuit configurations with small changes as compared to a conventional circuit.

In order to achieve the above objects, according to the present invention, there is provided a reception circuit comprising a reception section for performing frequency conversion of an input signal by using a local frequency signal generated by phase comparing operation, and a control section for removing a passing phase error, added in the reception section, on the basis of a phase comparison signal output from the reception section.

DESCRIPTION OF THE PREFERRED EMBODIMENTS

The present invention will be described in detail below with reference to the accompanying drawings.

Figure 1A:
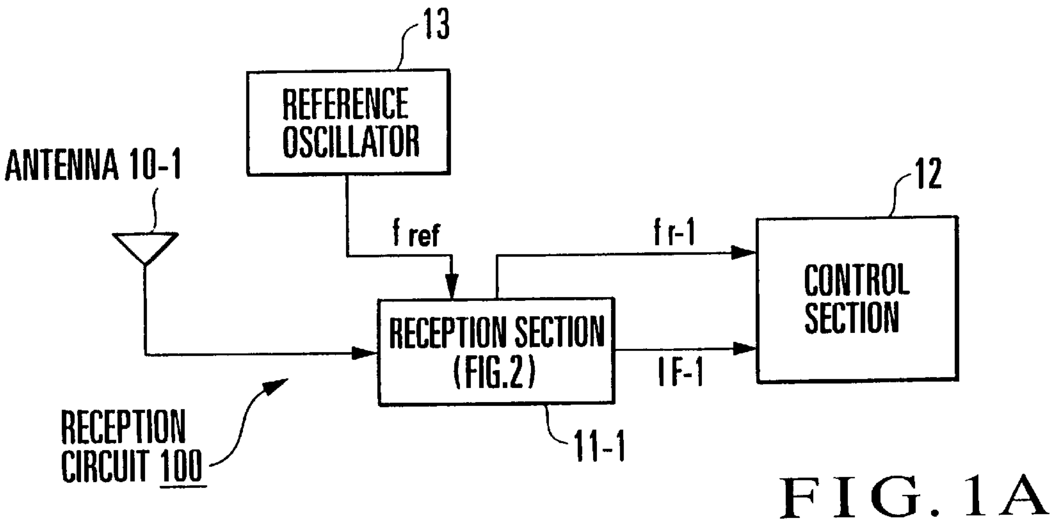
FIG. 1A is a block diagram of a reception circuit used in the system shown in FIG. 1B.
Figure 1B:
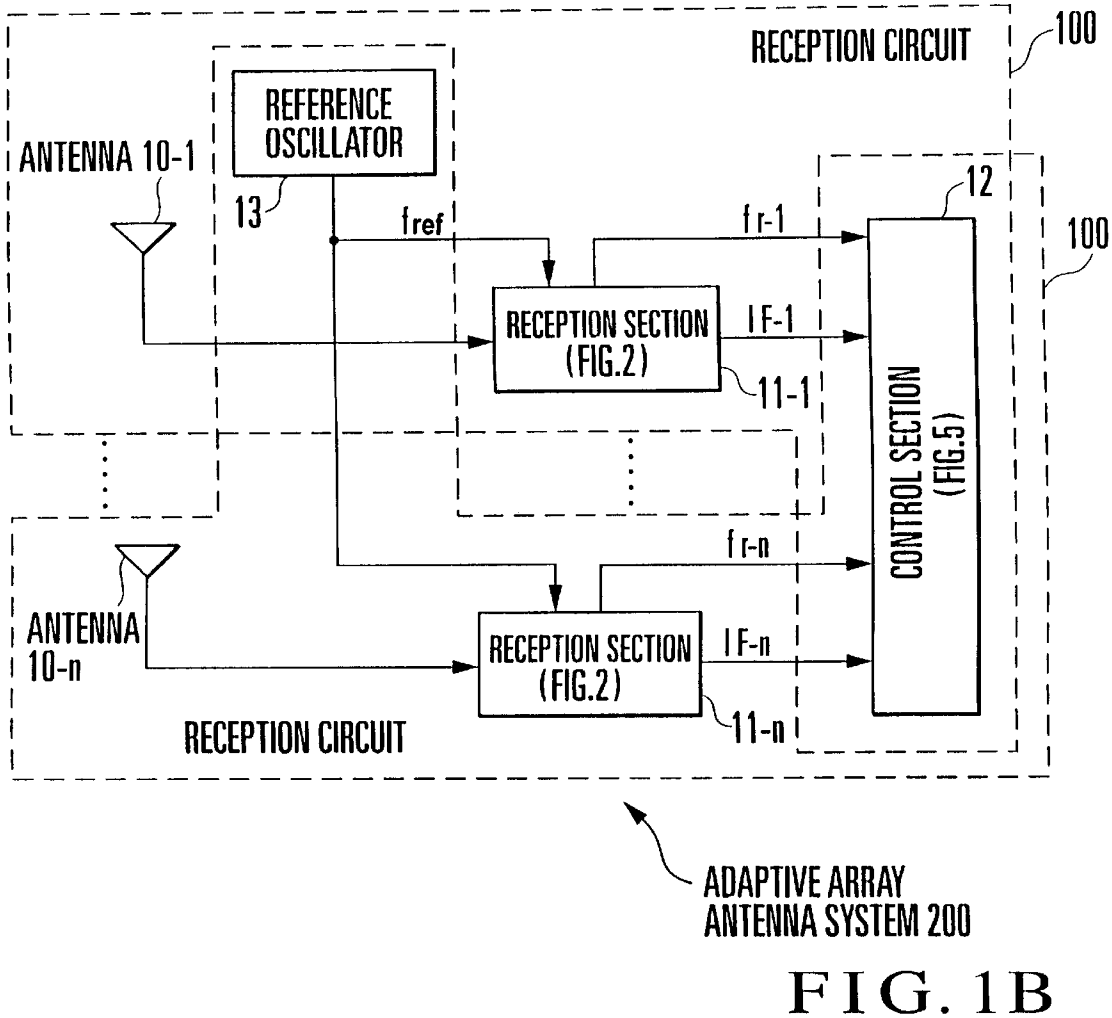
FIG. 1B is a block diagram of an adaptive array antenna system according to the first embodiment of the present invention.

FIG. 1A shows a reception circuit used for the adaptive array antenna system of the present invention shown in FIG. 1B. Referring to FIG. 1A, a reception circuit 100 includes an antenna 10-1, a reception section 11-1 for outputting a signal IF-1 obtained by converting an RF signal received through the antenna 10-1 into a signal having a lower frequency and a phase comparison signal fr-1, a control section 12 for removing a passing phase error from the signal IF-1 on the basis of the phase comparison signal fr-1, and a reference oscillator 13 for generating a high-precision reference signal and outputting it to the control section 12.

The signal received by the antenna 10-1 is input to the reception section 11-1 to be subjected to frequency conversion (down-conversion) and analog/digital conversion. The resultant signal IF-1 is output to the control section 12. An output from the reference oscillator 13 is input to the reception section 11-1 to be used for phase comparison in a circuit (PLL circuit to be described later) for generating a local oscillation signal for down-conversion. The phase comparison signal fr-1 obtained in the process of generating the local oscillation signal is output from the reception section 11-1 to the control section 12.

FIG. 1B shows the adaptive array antenna system according to the first embodiment of the present invention. The adaptive array antenna system shown in FIG. 1B is made up of a plurality of reception circuits 100, each shown in FIG. 1A. An adaptive array antenna system 200 in FIG. 1B will be described in detail below, together with the operation of the reception circuit 100 in FIG. 1A.

As shown in FIG. 1B, the adaptive array antenna system 200 is made up of n reception circuits 100. The system 200 includes n antennas 10-1 to 10-n in correspondence with the reception circuits 100. All the antennas 10-1 to 10-n are omnidirectional and arranged at intervals of λ/4 (λ is the wavelength of a frequency in use) or more. The respective reception circuits 100 share the control section 12 and reference oscillator 13.

Signals respectively received by the antennas 10-1 to 10-n are input to reception sections 11-1 to 11-n to undergo frequency conversion (down-conversion) and analog/digital conversion. Resultant signals IF-1 to IF-n are output to the control section 12. An output from the reference oscillator 13 is input to the reception sections 11-1 to 11-n and used for phase comparison in each local oscillation signal generating circuit for down-conversion. The reception sections 11-1 to 11-n output phase comparison signals fr-1 to fr-n, obtained when local oscillation signals are generated, to the control section 12. As described above, the reception circuit 100 in FIG. 1A is configured to correspond to one block in the adaptive array antenna system 200.

Figure 2:
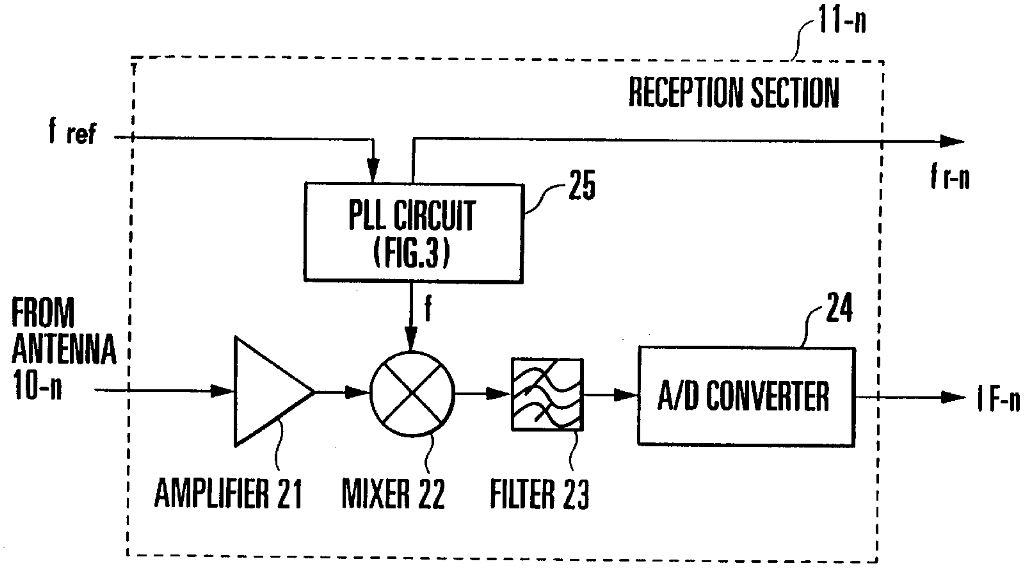
FIG. 2 is a block diagram of a reception section in FIG. 1B.

FIG. 2 shows the superheterodyne reception section 11-n. The reception sections 11-1 to 11-n have the same arrangement.

Referring to FIG. 2, the reception section 11-n is comprised of an amplifier 21 which has low-NF (Noise Factor) characteristics and amplifies a signal received by the antenna 10-n, a mixer 22 which is formed by a double-balanced mixer, transistor mixer, or the like and down-converts an output signal from the amplifier 21 on the basis of a PLL (Phase Locked Loop) output, a PLL circuit 25 for supplying a PLL output to the mixer 22, a filter 23 which is constituted by a SAW (Surface Acoustic Wave) element and the like and receives an output from the mixer 22 to remove out-of-band signals from the output, and an A/D converter 24 for converting the analog signal output from the filter 23 into the signal IF-n and outputting it to the control section 12.

A reference signal from the reference oscillator 13 is input to the PLL circuit 25. The PLL circuit 25 outputs the phase comparison signal fr-n to the control section 12.

Figure 3:
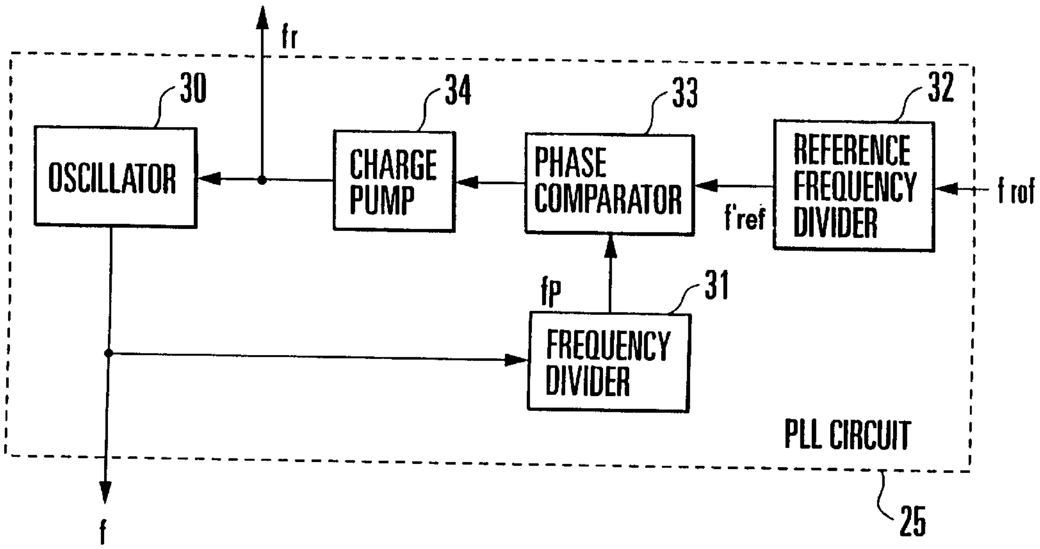
FIG. 3 is a block diagram of a PLL circuit in FIG. 2.

FIG. 3 shows the PLL circuit 25. The PLL circuit 25 generates a local oscillation signal f used for down-conversion by the mixer 22 on the basis of an output signal fref from the reference oscillator 13 (FIG. 1B). The PLL circuit 25 is comprised of an oscillator 30 formed by a VCO (Voltage-Controlled Oscillator) or the like, a frequency divider 31 for frequency-dividing an output from the oscillator 30, a reference frequency divider 32 for frequency-dividing the signal fref from the reference oscillator 13 (FIG. 1B), a phase comparator 33 for comparing the phase of an output signal fp (FIG. 4B) from the frequency divider 31 with that of an output signal f'ref (FIG. 4A) from the reference frequency divider 32 and outputting the phase comparison result as a digital signal, and a charge pump 34 which is constituted by a transistor and the like and controls the oscillator 30 on the basis of the digital signal from the phase comparator 33. A phase comparison signal fr (FIG. 4C) output from the charge pump 34 is output to the oscillator 30 and control section 12 (FIG. 1B).

Figure 5:
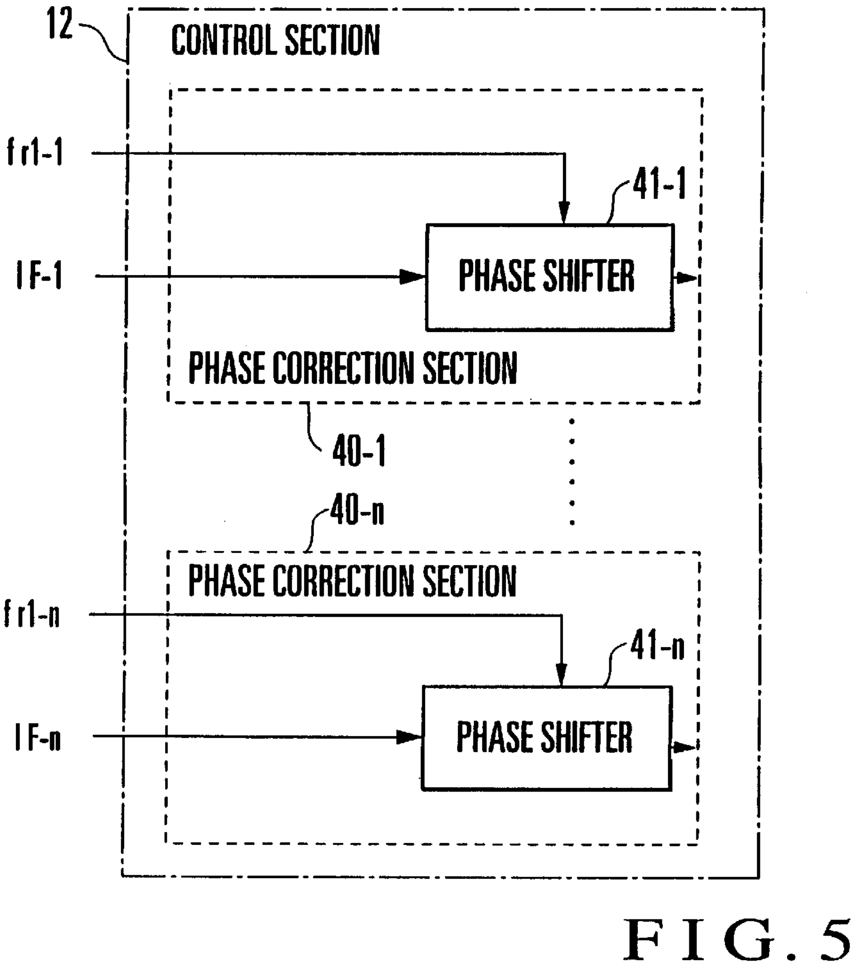
FIG. 5 is a block diagram of a control section in FIG. 1B.

FIG. 5 shows the control section 12. The control section 12 includes n phase correction sections 40-1 to 40-n corresponding to the reception sections 11-1 to 11-n. The phase correction sections 40-1 to 40-n respectively have phase shifters 41-1 to 41-n. That is, the control section 12 includes the n phase correction sections 40-1 to 40-n corresponding to the n antennas 10-1 to 10-n. The phase correction sections 40-1 to 40-n respectively incorporate the phase shifters 41-1 to 41-n for removing phase errors from the signals IF-1 to IF-n by using the phase comparison signals fr-i to fr-n output from the reception circuit 11. The processing performed by the control section 12 is processing based on digital signals, and hence can be implemented by either software or software.

The operation of the adaptive array antenna system having this arrangement will be described next. The reception signals received through the antennas 10-1 to 10-n are frequency-converted in the reception sections 11-1 to 11-n and output as the signals IF-1 to IF-n to the control section 12. At the same time, the reception sections 11-1 to 11-n perform phase comparison by using the PLL circuits 25 in the process of generating the local oscillation signals f for frequency conversion and output the resultant phase comparison signals fr-1 to fr-n to the control section 12.

The control section 12 removes the phase errors added to the signals IF-1 to IF-n in the reception sections 11-1 to 11-n by using the phase comparison signals fr-1 to fr-n, and fixes (synchronizes) passing phases between the respective reception sections 11. With this process, a phase deviation between the respective demodulated signals represents a reception delay phase to the antenna. This stabilizes the operation of the adaptive array antenna system and improves the reliability. Note that this phase detection is unique to the adaptive array antenna system and not directly relevant to the present invention. Therefore, a detailed description of this operation will be omitted.

The operation of the reception sections 11-1 to 11-n will be further described in detail next with reference to FIG. 2. Although the operation of the reception section 11-n will be described as an example, the same applies to the remaining reception sections.

The reception signal input to the reception section 11-n through the antenna 10-n is amplified by the low-NF amplifier 21. The amplified signal is frequency-converted (down-converted) by the mixer 22 using the local oscillation signal f from the PLL circuit 25. The filter 23 removes unnecessary radiation outside the pass band from the output from the mixer 22 and passes only a signal having a desired frequency. The signal (analog signal) passing through the filter 23 is converted into the digital signal IF-n by the A/D converter 24. This signal is then output to the control section 12.

As described above, the local oscillation signal f is generated by the PLL circuit 25 using the reference signal fref from the reference oscillator 13. In this embodiment, in the process of generating the local oscillation signal f, a phase comparison signal used for phase comparison is output as the signal fr-n to the control section 12.

The operation of the PLL circuit 25 for generating the local oscillation signal f will be described next with reference to FIG. 3. The output signal fref from the reference oscillator 13 is input to the reference frequency divider 32 to be frequency-divided into the predetermined frequency f'ref. The frequency divider 31 frequency-divides an output from the oscillator (VCO) 30 into a signal having the same frequency as that of the output f'ref from the reference frequency divider 32. The phase comparator 33 compares the phase of the output fp from the frequency divider 31 with that of the output f'ref from the reference frequency divider 32 and outputs the resultant signal as a digital signal representing the phase difference between the two signals. This digital signal is input to the charge pump 34 and output to the oscillator 30. As described above, as the voltage generated by the charge pump 34 is applied to the oscillator 30, the oscillation frequency of the oscillator 30 changes accordingly, thereby obtaining a desired frequency. The local oscillation signal f from the oscillator 30 is output to the mixer 22.

Figure 4A:
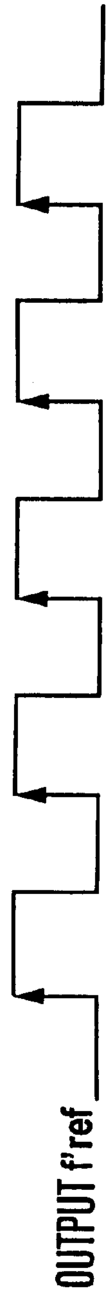
FIGS. 4A to 4C are timing charts showing the waveforms of the respective portions of the PLL circuit in FIG. 3.
Figure 4B:
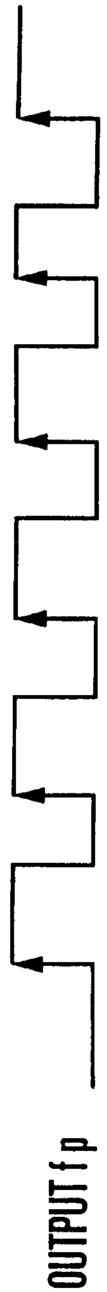
Figure 4C:
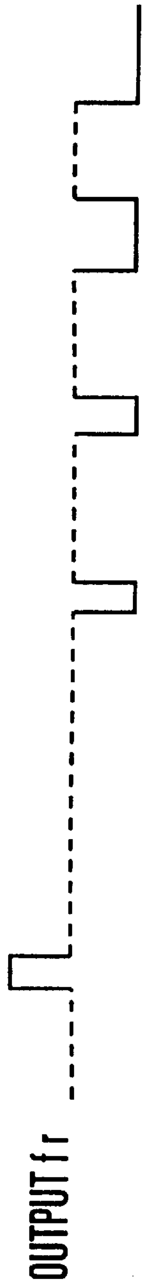

Phase comparing operation performed in the PLL circuit 25 will be described in detail next with reference to FIGS. 4A to 4C. The signal f'ref shown in FIG. 4A is output from the highly stable reference oscillator 13, and hence has a constant clock. The signal fp is output from the oscillator 30 formed by a VCO, and hence changes in oscillation frequency in accordance with the voltage applied from the charge pump 34. The phase comparator 33 compares the phase of this signal f'ref with that of the signal fp to make them have the same frequency.

In this phase comparison, the difference between the leading edge of the clock of the signal f'ref and the leading edge of the clock of the signal fp is detected and output. If, therefore, the phase of the signal fp lags the phase of the signal f'ref, an "H"-level signal is output. If the phase of the signal advances, an "L"-level signal is output. This "H"- or "L"-level signal is the signal fr shown in FIG. 4C. In this case, a portion other than the leading edge of the clock, i.e., the dotted line portion of the signal fr in FIG. 4C, is not subjected to phase comparison, and hence is not output as a signal. In this embodiment, this signal fr is input to the control section 12.

The operation of the control section 12 will be described next with reference to FIG. 5. The control section 12 detects only the propagation delay phase at the time of reception through the antenna by subtracting the phase errors of local oscillation signals added in the reception sections 11-1 to 11-n. The signals IF-1 to IF-n and signals fr-1 to fr-n are input in pairs to the corresponding phase shifters 41-1 to 41-n. When the signals fr-1 to fr-n are at "H" level, the phase of the signal fp, i.e., the local oscillation signal f, lags. For this reason, while the signals fr-1 to fr-n are at "H" level, the phase shifters 41-1 to 41-n lead the phases of the signals IF-1 to IF-n. That is, since the phases of the signals IF-i to IF-n lag when the local oscillation signal f with a phase lag is used in the reception sections 11-1 to 11-n, the phase shifter 41 leads the phase. As a consequence, the propagation delay phase differences received by the antennas 10-1 to 10-n can be directly detected from the phase shifter outputs.

Likewise, when the signals fr-1 to fr-n are at "L" level, it indicates that the phase of the local oscillation signal f in each of the reception sections 11-1 to 11-n advances. In the phase shifters 41-1 to 41-n, therefore, while the "L"-level signals fr-1 to fr-n are input, only the propagation delay phase difference at the reception of a signal through the antenna can be detected by delaying the phases of the signals IF-1 to IF-n.

Since the specific timings of the signals IF-1 to IF-n at which phase correction using the signals fr-1 to fr-n are to be started cannot be determined, the signals fr-1 to fr-n must be synchronized with the signals IF-1 to IF-n. For this reason, synchronization is achieved by starting phase correction of the signals IF-1 to IF-n with reference to the timing at which the oscillation frequency of the local oscillation signal f generated by the PLL circuit 25 is locked. With this operation, when the phase of the local oscillation signal f advances, the phase can be delayed by the phase shifter, and vice versa.

According to this embodiment, the phase comparison signals fr-1 to fr-n that have already been used in the process of generating the local oscillation signal f in the reception circuit 100 are used to correct passing phase differences in the reception circuit 100, and the phase added to the local oscillation signal f in the reception circuit 100 is removed. Then, the passing phases between the signals received through the antennas 10-1 to 10-n and the demodulated outputs are fixed. This greatly contributes to an improvement in the performance of an adaptive array antenna system or the like when the present invention is applied thereto.

Figure 6:
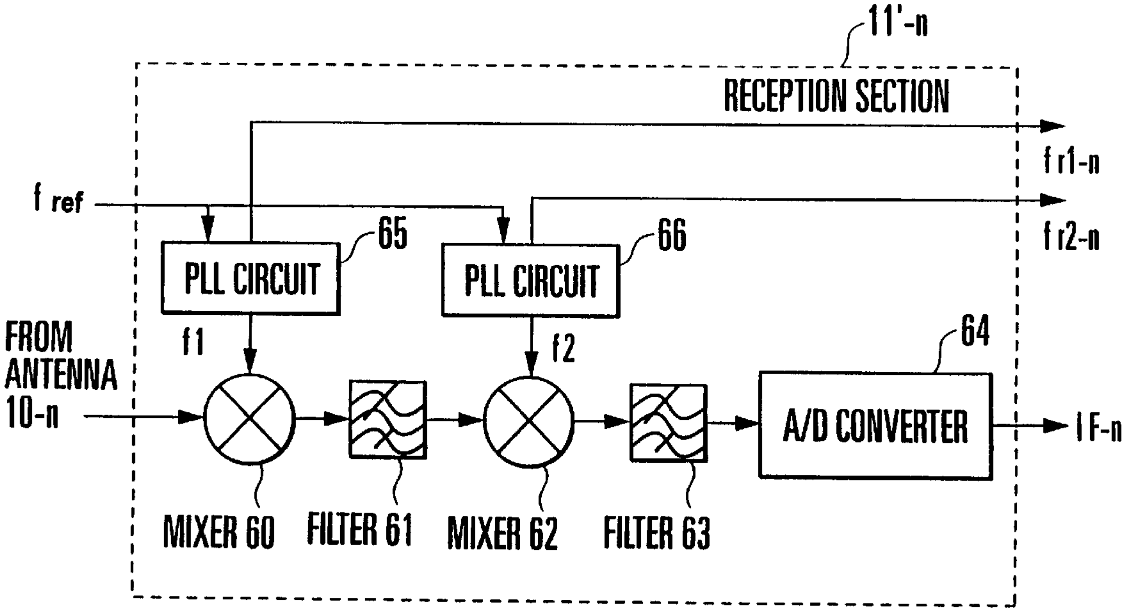
FIG. 6 is a block diagram of a reception section according to the second embodiment of the present invention.
Figure 7:
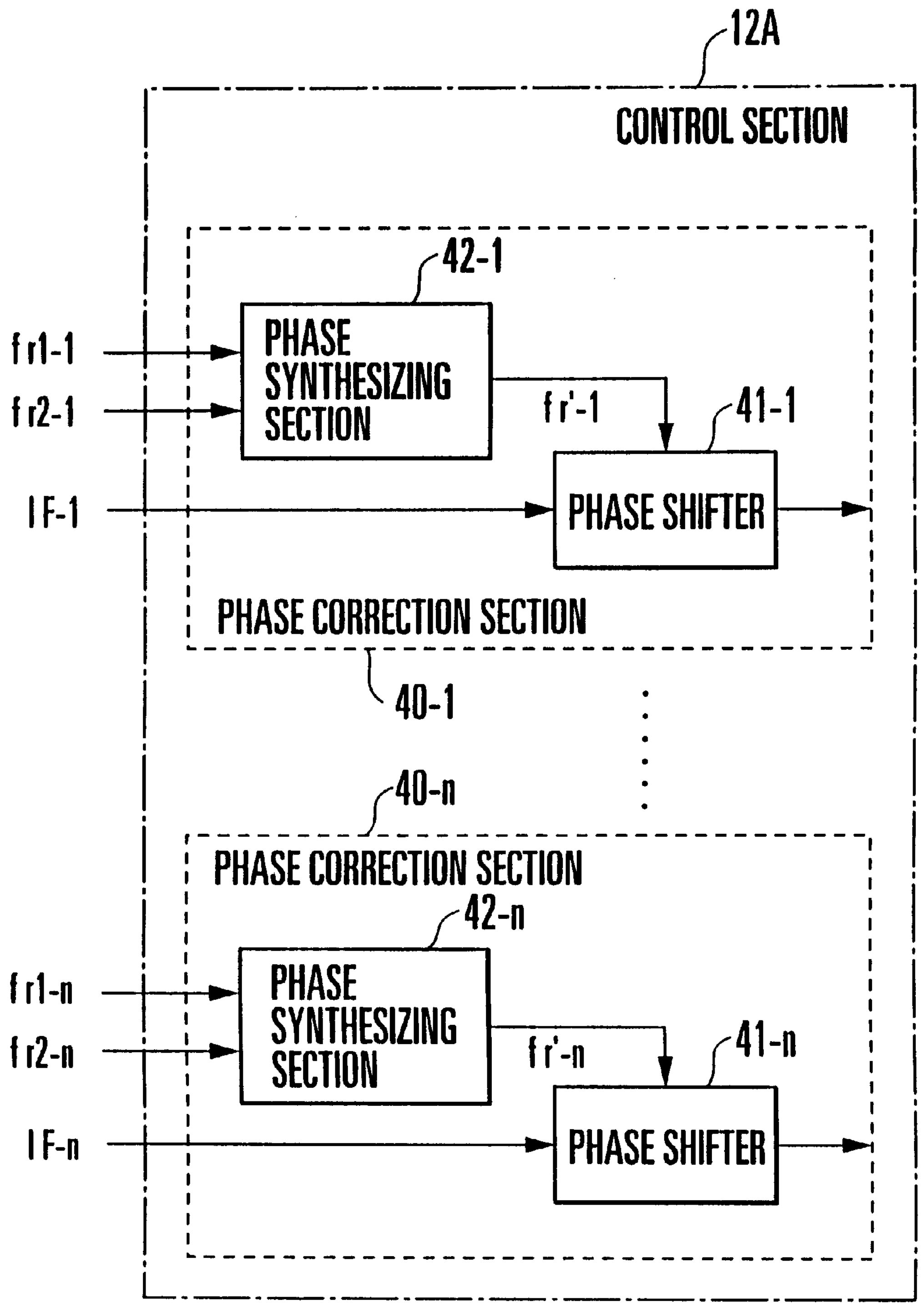
FIG. 7 is a block diagram of a control section in the second embodiment of the present invention.

A case wherein a plurality of local oscillation signals are used in a reception section like a double-superheterodyne reception section will be described next as the second embodiment. The overall system configuration of this embodiment is the same as that of the embodiment described above except for a reception section and control section. FIG. 6 shows the reception section in the second embodiment. FIG. 7 shows a control section 12A suited to this reception section. Note that since the overall system configuration of the second embodiment is the same as that of the first embodiment, a description thereof will be omitted.

Referring to FIG. 6, a reception section 11'-n performs down-conversion in two steps by using two PLL circuits 65 and 66. Consequently, two mixers 60 and 62 for down-conversion and two filters 61 and 63 for removing unnecessary radiation are used. Phase comparison signals fr1-n and fr2-n from the PLL circuits 65 and 66 are generated in the same manner as the signal fr in FIG. 4C. A control section 12 performs phase correction by using these signals. Reference numeral 64 denotes an A/D converter.

Referring to FIG. 7, the control section 12A further includes n phase synthesizing sections 42-1 to 42-n in correspondence with phase shifters 41-1 to 41-n. That is, the phase correction sections 40-1 to 40-n forming the control section 12A are constituted by the phase shifters 41-1 to 41-n and phase synthesizing sections 42-1 to 42-n. The phase shifter 41-1 receives a signal IF-1 from the reception section 11'-n, and the phase synthesizing section 42-1 as the counterpart receives phase comparison signals fr1-1 and fr2-1 from the reception section 11'-n. An output fr'-1 from the phase synthesizing section 42-1 is input to the phase shifter 41-1.

The operation of the control section 12A having this arrangement will be described. The phase comparison signals fr1-1 to fr1-n and fr2-1 to fr2-n are input in pairs to the corresponding the phase synthesizing sections 42-1 to 42-n. The phase synthesizing sections 42-1 to 42-n synthesize the phase of a local oscillation signal fl with that of a local oscillation signal f2. The phase shifters 41-1 to 41-n perform phase correction by using synthetic signals fr'-1 to fr'-n from the phase synthesizing sections 42-1 to 42-n.

Figures 8A, 8B, 8C:
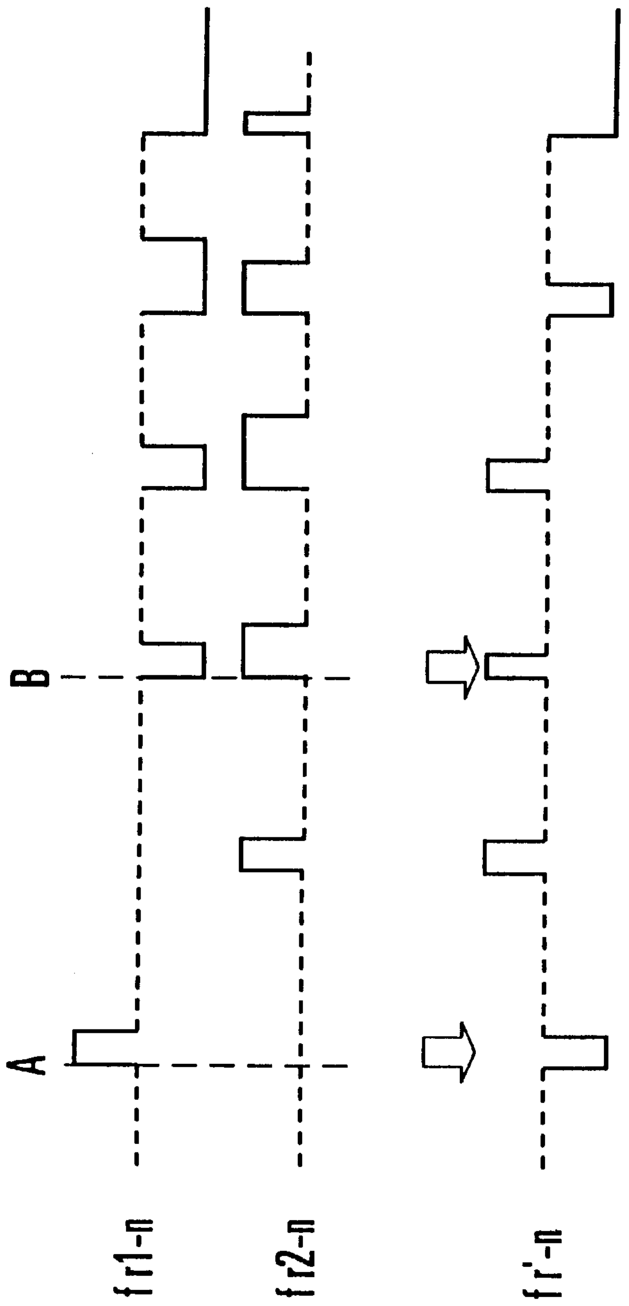
FIGS. 8A to 8C are timing charts for explaining the phase comparison signal synthesizing operation of a phase synthesizing section in FIG. 7.

Phase comparison signal synthesizing operation in the phase synthesizing sections 42-1 to 42-n will be described with reference to FIGS. 8A to 8C. The phase synthesizing section 42-n receives the phase comparison signals fr1-n and fr2-n shown in FIGS. 8A and 8B. The phase synthesizing section 42-n outputs a signal fr'-n obtained by adding phase difference signals based on the phase comparison signals fr1-n and fr2-n on the time axis as shown in FIG. 8C.

More specifically, at a point A, the signal fr1-n indicates a phase lag, and the signal fr2-n indicates an in-phase state. Therefore, the signal fr'-n (FIG. 8C) indicates only a phase lag portion of the signal fr1-n. Likewise, at a point B, the signal fr1-n indicates a phase lead, and the signal fr2-n indicates a phase lag. At this time, since the pulse width of the signal fr2-n is larger than that of the signal fr1-n, the phase error indicated by the signal fr2-n is large. The pulse width of the signal fr'-n is therefore determined to delay the phase by the difference represented by (fr2-n)−(fr1-n).

The phase shifters 41-1 to 41-n perform phase correction on the basis of the signal fr'-n including the phase information of the signals fr1-n and fr2-n.

According to this embodiment, since phase correction can be performed on the basis of a plurality of phase comparison signals, the phase differences between reception signals which are unique to the respective antennas can be corrected, i.e., normalized, to be fixed, thereby stably operating the adaptive array antenna system.

Note that each of the reception circuits constituting the adaptive array antenna system described above can be effectively used singly depending on the application purpose. More specifically, for example, this circuit can be used to remove, control, or fix the phase lag of a passing signal with respect to an input signal while performing frequency conversion.

The reception circuit in this case is comprised of reception sections 11-1 and 11'-1 which receive RF signals and include PLL circuits, a reference oscillator 13 for supplying a reference frequency to the reception sections 11-1 and 11'-1, and control sections 12 and 12A which receive down-conversion outputs from the reception sections 11-1 and 11'-1 and phase comparison signals. The control sections 12 and 12A provide low-frequency signal outputs controlled to have predetermined phase relationships with input signals.

AS has been described above, according to the present invention, since the phase errors between local oscillation signals which are added in the reception sections are removed on the basis of phase comparison signals in the process of generating the local oscillation signals, the phase between a reception signal and a demodulated signal in each reception circuit is fixed, contributing to stabilization of an apparatus using such reception circuits.

When a plurality of local oscillation signals are to be used as well, phase correction is performed by removing the phase errors, added to reception circuit output signals, by using phase comparison signals in the process of generating the respective local oscillation signals, thereby correcting passing phases in the same manner as described above.

Furthermore, since phase correction is performed by only using the arrangement that effectively uses signals from existing constituent elements, i.e., phase comparison signals in the process of generating local oscillation signals, an unnecessary increase in apparatus size can be suppressed.

What is claimed is:

1. A reception circuit comprising:

a reception section for performing frequency conversion of an input signal by using a local frequency signal generated by phase comparing operation; and a control section for removing a passing phase error from a reception output signal, added in said reception section, on the basis of a phase comparison signal output from said reception section.

2. A circuit according to claim 1, wherein said control section comprises a phase shifter for shifting a phase of said reception output signal on the basis of the phase comparison signal from said reception section.

3. A circuit according to claim 1, wherein said reception section comprises:

a first PLL circuit for outputting a first phase comparison signal indicating a phase comparison by comparing a phase of an oscillation frequency of a first local oscillator with a phase of an external reference frequency, and for outputting a first local frequency signal by controlling the oscillation frequency of said local oscillator on the basis of the phase comparison result; and a first mixer circuit for down-converting an input signal by using the first local frequency signal from said first PLL circuit, wherein said control section synchronizes the passing phase of the reception output signal in said reception section by correcting the passing phase added in said reception section using at least the first phase comparison signal from said first PLL circuit.

4. A circuit according to claim 3, wherein said reception section further comprises:

a second PLL circuit for outputting a second phase comparison signal indicating a phase comparison by comparing a phase of an oscillation frequency of a second local oscillator with a phase of said external reference frequency, and outputting a second local frequency signal by controlling the oscillation frequency of said second local oscillator on the basis of the phase comparison result; and a second mixer circuit for down-converting an output from said first mixer by using the second local frequency signal from said second PLL circuit, wherein said control section synchronizes a passing phase of the reception output signal in said reception section by correcting the passing phase added in said reception section, using first and second phase comparison signals from said first and second PLL circuits.

5. A circuit according to claim 4, wherein said control section comprises:

a phase synthesizing section for synthesizing the first and second phase comparison signals from said first and second PLL circuits; and a phase shifter for shifting a phase of a reception output signal on the basis of a synthetic phase comparison signal from said phase synthesizing section.

6. A circuit according to claim 3, further comprising:

a reference oscillator for outputting an external reference frequency to said first PLL circuit.

7. An adaptive array antenna system comprising:

a plurality of antennas;

a reference oscillator for outputting a reference frequency;

a plurality of reception sections, which are provided in correspondence with said antennas, generate local frequency signals by comparing a phase of the reference frequency from said reference oscillator with phases of local oscillation signals, and perform frequency conversion of input signals by using the generated local frequency signals; and a control section for removing passing phase errors from reception output signals, added in said reception section, on the basis of phase comparison signals output from said reception sections.

8. A system according to claim 7, wherein said control section comprises a phase shifter for shifting a phase of a reception output on the basis of a phase comparison signal from said reception section.

9. A system according to claim 7, wherein said reception section comprises:

a first PLL circuit for outputting a first phase comparison signal indicating a phase comparison by comparing a phase of an oscillation frequency of said first local oscillator with a phase of said reference frequency, and outputting a first local frequency signal by controlling the oscillation frequency of said local oscillator on the basis of the phase comparison result; and a first mixer circuit for down-converting an input signal by using the first local frequency signal from said first PLL circuit, wherein said control section synchronizes a passing phase of a reception output in said reception circuit by correcting a passing phase, added in said reception section, by using at least the first phase comparison signal from said first PLL circuit.

10. A system according to claim 9, wherein said reception section further comprises:

a second PLL circuit for outputting a second phase comparison signal indicating a phase comparison by comparing a phase of an oscillation frequency of said second local oscillator with the phase of the reference frequency, and outputting a second local frequency signal by controlling the oscillation frequency of said second local oscillator on the basis of the phase comparison result; and a second mixer circuit for down-converting an output from said first mixer circuit by using the second local frequency signal from said second PLL circuit, wherein said control section synchronizes a passing phase of a reception output in said reception circuit by correcting a passing phase, added in said reception section, by using first and second phase comparison signals from said first and second PLL circuits.

11. A system according to claim 10, wherein said control section comprises:

a phase synthesizing section for synthesizing the first and second phase comparison signals from said first and second PLL circuits; and a phase shifter for shifting a phase of reception output on the basis of a synthetic phase comparison signal from said phase synthesizing section.

12. A reception circuit comprising:

means for converting a frequency of an input signal with reference to a local frequency signal generated by a phase comparing operation; and means for correcting a phase error in a reception output signal with reference to a phase comparison signal output from said frequency converting means.

13. The reception circuit, as claimed in claim 12, wherein said correcting means comprises a means for shifting a phase of said reception output signal on the basis of the phase comparison signal from said frequency converting means.

14. An adaptive array antenna system comprising:

a plurality of antennas;

a plurality of reception sections connected to said plurality of antennas; and a reference oscillator connected to said plurality of reception sections, said reference oscillator for outputting a reference frequency, wherein said plurality of reception sections generate local frequency signals by comparing a phase of the reference frequency from said reference oscillator with phases of local oscillation signals.

15. The adaptive array antenna system as claimed in claim 14, wherein said plurality of reception sections perform frequency conversion of input signals by using the generated local frequency signals.

16. The adaptive array antenna system as claimed in claim 14, further comprising:

a control section for removing phase errors from frequency converted signals output from said plurality of reception sections on the basis of phase comparison signals output from said plurality of reception sections.

* * * * *